(12) United States Patent
Bessou et al.

(10) Patent No.: US 11,588,984 B2
(45) Date of Patent: *Feb. 21, 2023

(54) OPTIMIZED EXPOSURE TEMPORAL SMOOTHING FOR TIME-LAPSE MODE

(71) Applicant: GoPro, Inc., San Mateo, CA (US)

(72) Inventors: Nicolas Bessou, Issy-les-Moulineaux (FR); Romain Gounelle, Haut de Seine (FR)

(73) Assignee: GoPro, Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/378,903

(22) Filed: Jul. 19, 2021

(65) Prior Publication Data

US 2021/0344829 A1 Nov. 4, 2021

Related U.S. Application Data

(63) Continuation of application No. 16/985,499, filed on Aug. 5, 2020, now Pat. No. 11,070,742, which is a continuation of application No. 16/107,404, filed on Aug. 21, 2018, now Pat. No. 10,771,712.

(60) Provisional application No. 62/562,755, filed on Sep. 25, 2017.

(51) Int. Cl.
| | |
|---|---|
| *H04N 5/235* | (2006.01) |
| *H04N 5/262* | (2006.01) |
| *H04N 5/335* | (2011.01) |
| *H04N 5/225* | (2006.01) |
| *H04N 5/355* | (2011.01) |

(52) U.S. Cl.
CPC ......... *H04N 5/2356* (2013.01); *H04N 5/2351* (2013.01); *H04N 5/2353* (2013.01); *H04N 5/2625* (2013.01); *H04N 5/35581* (2013.01); *H04N 5/2258* (2013.01)

(58) Field of Classification Search
CPC .. H04N 5/2356; H04N 5/2351; H04N 5/2353; H04N 5/2625; H04N 5/35581; H04N 5/2258
See application file for complete search history.

(56) References Cited

U.S. PATENT DOCUMENTS

| | | | |
|---|---|---|---|
| 9,456,143 B2 | 9/2016 | Ikeda | |
| 10,432,873 B2 * | 10/2019 | Matsuhashi | .......... H04N 5/2353 |
| 10,771,712 B2 | 9/2020 | Bessou | |
| 11,070,742 B2 | 7/2021 | Bessou | |

(Continued)

*Primary Examiner* — Ahmed A Berhan
(74) *Attorney, Agent, or Firm* — Young Basile Hanlon & MacFarlane, P.C.

(57) ABSTRACT

A method for reducing overexposure or underexposure in a time-lapse includes acquiring, using an image capture device, a first frame of the time-lapse using a first exposure setting; and acquiring, using the image capture device, a second frame of the time-lapse. The first frame of the time-lapse is acquired under a first luminance condition. The second frame of the time-lapse is acquired under a second luminance condition that is different from the first luminance condition. The second frame of the time-lapse is acquired using an exposure setting that is determined based on respective exposure settings of one or more preview images obtained between the first frame of the time-lapse and the second frame of the time-lapse. The one or more preview images are not included in the time-lapse.

20 Claims, 5 Drawing Sheets

(56) References Cited

U.S. PATENT DOCUMENTS

| | | | |
|---|---|---|---|
| 2012/0249853 A1* | 10/2012 | Krolczyk | H04N 1/215 348/E5.022 |
| 2015/0350544 A1* | 12/2015 | Williams | H04N 5/2356 348/239 |
| 2019/0098196 A1 | 3/2019 | Bessou | |
| 2019/0246024 A1 | 8/2019 | Nakamura | |
| 2020/0366828 A1 | 11/2020 | Bessou | |

* cited by examiner

OPTIMIZED EXPOSURE TEMPORAL SMOOTHING FOR TIME-LAPSE MODE

CROSS REFERENCE TO RELATED APPLICATIONS

This application is a continuation of U.S. application Ser. No. 16/985,499, filed Aug. 5, 2020, which is a continuation of U.S. application Ser. No. 16/107,404, filed Aug. 21, 2018, which claims the benefit of U.S. Provisional Application No. 62/562,755, filed Sep. 25, 2017, the contents of which are incorporated by reference herein in their entireties.

BACKGROUND

Image capture devices, such as cameras, may capture content as images, video, and time-lapses. Light may be received and focused via a lens and may be converted to an electronic image signal by an image sensor. The image signal may be processed by an image signal processor to form an image, which may be stored and/or encoded.

SUMMARY

The present disclosure satisfies the foregoing needs by providing, inter alia, apparatus and methods for image signal processing based encoding hints for motion estimation.

A first aspect of the disclosure is a camera for capturing a time-lapse. The camera includes a processor that is configured to acquire a first frame of the time-lapse; calculate an exposure setting for a second frame of the time-lapse; and acquire the second frame of the time-lapse using the exposure setting. The exposure setting prevents a flickering effect in the time-lapse. The exposure setting is determined using one or more preview images that are previewed in a time gap between the first frame and the second frame.

A second aspect of this disclosure is a method for reducing overexposure or underexposure in a time-lapse. The method includes acquiring, using an image capture device, a first frame of the time-lapse using a first exposure setting; obtaining, using the image capture device, a preview image that is not included in the time-lapse using a preview exposure setting; determining a second exposure setting by smoothing the first exposure setting and the preview exposure setting; and acquiring, using the image capture device, a second frame of the time-lapse using the second exposure setting.

A third aspect of this disclosure is a non-transitory computer-readable storage medium that includes executable instructions that, when executed by a processor, facilitate performance of operations for reducing overexposure or underexposure in a time-lapse. The operations include operations to capture a first frame of the time-lapse using a first exposure setting; acquire one or more preview images during a time gap between the first frame of the time-lapse and a next frame of the time-lapse, where a last preview image of the one or more preview images is acquired using a last exposure setting; calculate a second exposure setting using the last exposure setting; and capture the next frame of the time-lapse using the second exposure setting.

A fourth aspect is a method for reducing overexposure or underexposure in a time-lapse. The method includes acquiring, using an image capture device, a first frame of the time-lapse using a first exposure setting; and acquiring, using the image capture device, a second frame of the time-lapse. The first frame of the time-lapse is acquired under a first luminance condition. The second frame of the time-lapse is acquired under a second luminance condition that is different from the first luminance condition. The second frame of the time-lapse is acquired using an exposure setting that is determined based on respective exposure settings of one or more preview images obtained between the first frame of the time-lapse and the second frame of the time-lapse. The one or more preview images are not included in the time-lapse.

A fifth aspect is an imaging device that includes a processor. The processor is configured to obtain a first frame of a time-lapse using a first exposure setting; set a second exposure setting that is based on respective exposure settings of one or more preview images obtained after the first frame of the time-lapse and before a second frame of the time-lapse; and obtain the second frame of the time-lapse using the second exposure setting. The one or more preview images are not included in the time-lapse.

A sixth aspect is a non-transitory computer-readable storage medium that includes executable instructions that, when executed by a processor, facilitate performance of operations to reduce overexposure or underexposure in a time-lapse. The operations comprising operations to obtain a first frame of the time-lapse using a first exposure setting; obtain one or more preview images after obtaining the first frame and before obtaining a second frame of the time-lapse; obtain a second exposure setting based on respective exposure settings of at least some of the one or more preview images; and obtain the second frame of the time-lapse using the second exposure setting. The one or more preview images are not included in the time-lapse.

These and other aspects of the present disclosure are disclosed in the following detailed description, the appended claims, and the accompanying figures.

BRIEF DESCRIPTION OF THE DRAWINGS

The disclosed embodiments have other advantages and features that will be more readily apparent from the detailed description, the appended claims, and the accompanying figures. A brief introduction of the figures is below.

DETAILED DESCRIPTION

Figure 1:
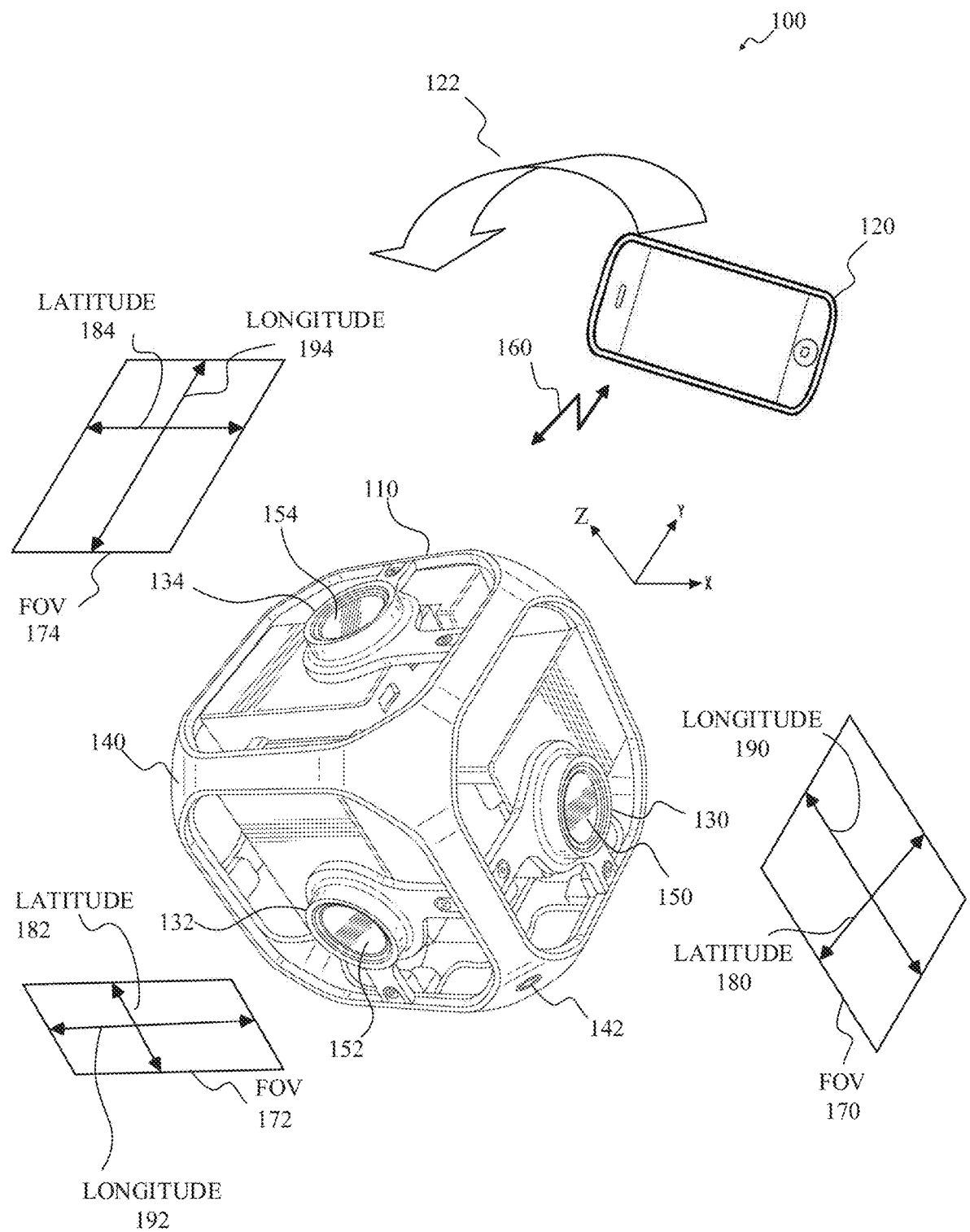
FIG. 1 is a diagram of an example of an image capture system for content capture.

As mentioned above, an image capture system can be used to capture video sequences. The video sequence is a sequence of frames that is captured and played back at some frame rate. For example, the rate may be 30 frames per second (fps). As such, the time interval between every two successive frames is $\frac{1}{30}^{th}$ of a second. The amount of light in the scene that is captured can change from one frame to the next frame. As such, a frame may look brighter or dimmer than a subsequent frame. The change in exposure from one frame to another can cause flicker during playback. Auto-exposure capabilities of the image capture system can be used to smooth out (e.g., eliminate or reduce) the flickering effect thereby providing a smooth viewing experience. A module of the image capture system may provide the auto-exposure capabilities, which may operate in several modes.

The image capture system, via the auto-exposure capabilities, can determine the optimal camera settings for capturing content, such as a frame of video, so that the captured frame is not over- or under-exposed to light. Auto-exposure can set capture parameters (e.g., shutter speed, aperture setting, ISO speed) before capturing the frame.

In auto-exposure video mode, when capturing a video sequence, the image capture system can use a previous frame to determine the exposure settings for a next frame. For example, the image capture system can analyze statistics of the pixel values of the previous frame to determine the exposure settings for the next frame. In an example, the analysis may include determining an overall luminance value of the previous frame. The overall luminance can be used to determine the exposure setting for the next frame. Other analysis techniques of the previous frame may be used to set the auto-exposure settings for the capturing the next frame. The analysis can be carried out continuously (i.e., for every acquired frame).

One parameter of the auto-exposure settings is the exposure time (also referred to as shutter speed). The exposure time indicates when the sensor(s) of the image capture system open and close to incoming light from a lens of the image capture system. That is, exposure time refers to the time that the shutter remains open allowing light to enter the image capture system. For example, the image capture system may be an exposure time of one (1) millisecond (ms) for highly lit scenes, such as outdoor scenes, and 100 ms for less highly lit scenes, such as indoor scenes.

While using the previous frame to set the exposure for the next frame can result in overall smooth viewing experience over the whole of a video sequence, abrupt lighting changes from one frame to the next may still be experienced. For example, assume that a first frame is captured in-door at an exposure time of 100 ms and that the video capture proceeds out-door at a relatively smooth and continuous pace. As such, the transition from the in-door setting to the out-door setting can be over time, such as, for example, one-half of a second. After the one-half second, the exposure should to be set 1 ms. However, the auto-exposure video mode can provide a smooth transition from 100 ms to 1 ms. During the transition time, the exposure is said to converge: that is the exposure converges from 100 ms to 1 ms.

The transition can correspond to the time that a human eye requires to adapt to the new lighting conditions. The transition can be over several frames. As such, the auto-exposure video mode can use temporal smoothing to prevent abrupt changes from one frame to the next. After the transition frames, the exposure can be set to 1 ms. However, for each of the transition frames, the exposure can be set to a value between 100 ms to 1 ms. For example, and assuming three (3) transition frames, the exposure for the first transition frame can be set to 90 ms, the exposure for the second transition frame can be set to 80, the exposure of the third transition frame can be set to 40, and the exposure of the next frame can be set to 1 ms. As such, temporal smoothing converges the exposure to the new scene conditions.

The image capture system can also be used to generate time-lapse video sequences (herein referred to as time-lapses). The image capture system can be used to capture frames at a given interval (i.e., a capture rate). For example, frames of a time-lapse can be captured every 2 seconds, 5 seconds, 10 seconds, or any other time interval. The image capture system can assemble the frames into the time-lapse such that the frames are displayed at a much faster rate than the capture rate. For example, whereas the capture rate can be one (1) frame every 10 seconds, the display rate can be 30 frames per second. As such, the display rate can be a factor from 60 to 900 of the capture rate.

Temporal smoothing as described above can be used to adjust the exposure before capturing a next frame of the time-lapse. If temporal smoothing is not applied, then the exposure can change far too fast between frames of the time-lapse thereby producing a flickering effect during playback. For example, clouds can cover or uncover the sun fast, which in turn causes fast exposure changes.

However, a problem still exists with time-lapses even after applying temporal smoothing. Whereas frames are taken every $\frac{1}{30}^{th}$ of a second for a video sequence, frames are taken every, e.g., 10 seconds for a time-lapse. Whereas the scene (e.g., the luminance of the scene) does not change abruptly from frame to frame in $\frac{1}{30}^{th}$ of a second, it can dramatically change in 10 seconds. For example, a first frame can be taken in-door (e.g., in the basement of a house) and the subsequent frame of the time-lapse can be taken out-doors (e.g., on a sunny summer day). As such, the statistics of the first frame are not very helpful in setting the exposure for the second frame. That is, the statistics of the first frame are not helpful in setting the exposure for the second frame when the scenes change significantly from one frame to the next.

As mentioned above, a time gap exists between the capture of two consecutive frames of a time-lapse. Implementations according to this disclosure can use the time gap to reduce and/or eliminate flicker in a time-lapse.

Implementations according to this disclosure can acquire one or more preview images during the time gap. Temporal smoothing can be applied between the preview images. The exposure of the last preview image taken during the time gap can be used to set the exposure for the next frame of the time-lapse. As such, the exposure of the next frame of the time-lapse reflects a more recent history of the scene than that of the previous frame. For example, if the preview images are captured at the video rate (i.e., 30 fps), then the last preview image can reflect the history of the scene as of 1 ms ago, whereas the previous frame reflects the scene as of, e.g., 10 minutes ago. As such, the preview images can be used to continuously estimate the exposure for a next preview image and/or frame of the time-lapse.

Implementations according to this disclosure can further adapt the temporal smoothing based on a difference between the last frame of the time-lapse and the last preview image. The difference between the last frame of the time-lapse and the last preview image is referred to herein as "exposure difference since the last frame" or "exposure difference."

In an example, the difference can be the luminance difference. For example, if the luminance difference is large, then a fast temporal smoothing is used, otherwise a slow temporal smoothing is used. The temporal smoothing is adapted using a damping factor.

Using a continuous stream of preview images between each two frames of a time-lapse can ensure that exposure converges even if the scene significantly changes between two frames of the time-lapse. As such, the risk of overexposure (resulting in very light frames) and/or underexposure (resulting in dark frames) can be reduced. Overexposure can occur when too much light is recorded. Underexposure can occur when not enough light is recorded.

Some techniques for removing flicker from a time-lapse include post processing of the time-lapse. For example, after the time-lapse is captured, it may be transferred to another device where a software program can be used to de-flicker (i.e., remove the flicker) from the time-lapse. However, implementations according to this disclosure eliminate the need for post-processing as the image capture system itself can generate flicker-free (or at least reduced flicker) time-lapses.

Implementations are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIG. 1 is a diagram of an example of an image capture system 100 for content capture. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, The image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a lateral dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, in some implementations, each of the image capture devices 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, in some implementations, the image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application (e.g., GoPro App), may generate and share, such as via a cloud-based or social media service, one or more images, or short video clips, such as in response to user input.

In some implementations, the user interface device 120, such as via an application (e.g., GoPro App), may remotely control the image capture apparatus 110, such as in response to user input.

In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input.

In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2B:
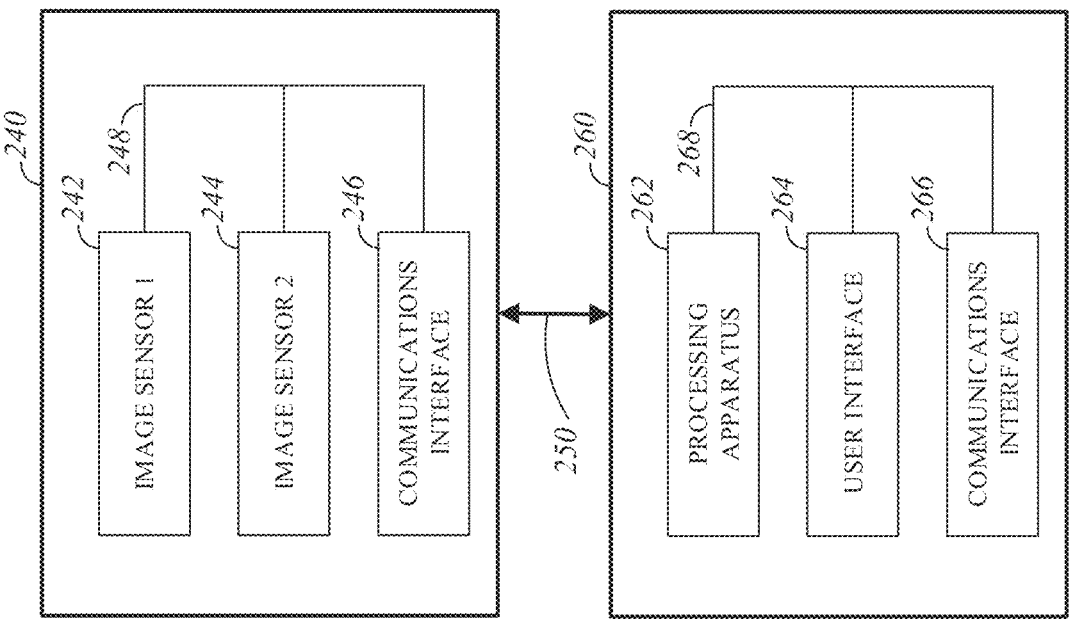
FIG. 2B is a block diagram of an example system configured for image capture according to implementations of this disclosure.
Figure 2A:
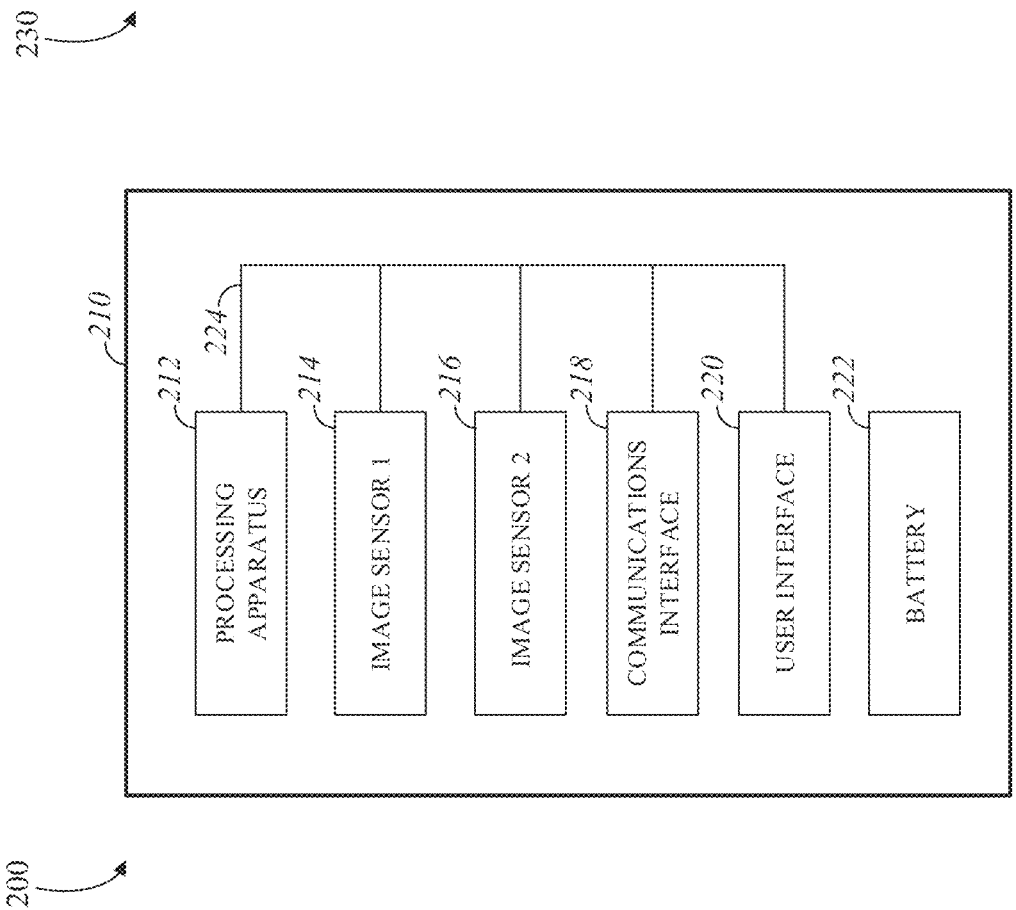
FIG. 2A is a block diagram of an example system for image capture according to implementations of this disclosure.

FIG. 2A is a block diagram of an example of a system 200 configured for image capture according to implementations of this disclosure. The system 200 includes an image capture device 210 (e.g., a camera or a drone) that includes a processing apparatus 212 that is configured to receive a first image from the first image sensor 214 and receive a second image from the second image sensor 216. The processing apparatus 212 may be configured to perform image signal processing (e.g., filtering, tone mapping, stitching, and/or encoding) to generate output images based on image data from the image sensors 214 and 216. The image capture device 210 includes a communications interface 218 for transferring images to other devices. The image capture device 210 includes a user interface 220, which may allow a user to control image capture functions and/or view images. The image capture device 210 includes a battery 222 for powering the image capture device 210. The components of the image capture device 210 may communicate with each other via the bus 224. The system 200 may be used to implement techniques described in this disclosure, such as the technique 400 of FIG. 4.

The processing apparatus 212 may include one or more processors having single or multiple processing cores. The processing apparatus 212 may include memory, such as random access memory device (RAM), flash memory, or any other suitable type of storage device such as a non-transitory computer readable memory. The memory of the processing apparatus 212 may include executable instructions and data that can be accessed by one or more processors of the processing apparatus 212. For example, the processing apparatus 212 may include one or more DRAM modules such as double data rate synchronous dynamic random-access memory (DDR SDRAM). In some implementations, the processing apparatus 212 may include a digital signal processor (DSP). In some implementations, the processing apparatus 212 may include an application specific integrated circuit (ASIC). For example, the processing apparatus 212 may include a custom image signal processor.

The first image sensor 214 and the second image sensor 216 are configured to detect light of a certain spectrum (e.g., the visible spectrum or the infrared spectrum) and convey information constituting an image as electrical signals (e.g., analog or digital signals). For example, the image sensors 214 and 216 may include charge-coupled devices (CCD) or active pixel sensors in complementary metal-oxide-semiconductor (CMOS). The image sensors 214 and 216 may detect light incident through respective lens (e.g., a fisheye lens). In some implementations, the image sensors 214 and 216 include digital to analog converters. In some implementations, the image sensors 214 and 216 are held in a fixed orientation with respective fields of view that overlap.

The image capture device 210 may include a communications interface 218, which may enable communications with a personal computing device (e.g., a smartphone, a tablet, a laptop computer, or a desktop computer). For example, the communications interface 218 may be used to receive commands controlling image capture and processing in the image capture device 210. For example, the communications interface 218 may be used to transfer image data to a personal computing device. For example, the communications interface 218 may include a wired interface, such as a high-definition multimedia interface (HDMI), a universal serial bus (USB) interface, or a FireWire interface. For example, the communications interface 218 may include a wireless interface, such as a Bluetooth interface, a ZigBee interface, and/or a Wi-Fi interface.

The image capture device 210 may include a user interface 220. For example, the user interface 220 may include an LCD display for presenting images and/or messages to a user. For example, the user interface 220 may include a button or switch enabling a person to manually turn the image capture device 210 on and off. For example, the user interface 220 may include a shutter button for snapping pictures.

The image capture device 210 may include a battery 222 that powers the image capture device 210 and/or its peripherals. For example, the battery 222 may be charged wirelessly or through a micro-USB interface.

FIG. 2B is a block diagram of an example of a system 230 configured for image capture according to implementations of this disclosure. The system 230 includes an image capture device 240 and a personal computing device 260 that communicate via a communications link 250. The image capture device 240 includes a first image sensor 242 and a second image sensor 244 that are configured to capture respective images. The image capture device 240 includes a communications interface 246 configured to transfer images via the communication link 250 to the personal computing device 260. The personal computing device 260 includes a processing apparatus 262 that is configured to receive, using the communications interface 266, a first image from the first image sensor, and receive a second image from the second image sensor 244. The processing apparatus 262 may be configured to perform image signal processing (e.g., filtering, tone mapping, stitching, and/or encoding) to generate output images based on image data from the image sensors 242 and 244. The system 230 may be used to implement techniques described in this disclosure, such as the technique 400 of FIG. 4.

The first image sensor 242 and the second image sensor 244 are configured to detect light of a certain spectrum (e.g., the visible spectrum or the infrared spectrum) and convey information constituting an image as electrical signals (e.g., analog or digital signals). For example, the image sensors 242 and 244 may include charge-coupled devices (CCD) or active pixel sensors in complementary metal-oxide-semiconductor (CMOS). The image sensors 242 and 244 may detect light incident through respective lens (e.g., a fisheye lens). In some implementations, the image sensors 242 and 244 include digital to analog converters. In some implementations, the image sensors 242 and 244 are held in a fixed relative orientation with respective fields of view that overlap. Image signals from the image sensors 242 and 244 may be passed to other components of the image capture device 240 via the bus 248.

The communications link 250 may be a wired communications link or a wireless communications link. The communications interface 246 and the communications interface 266 may enable communications over the communications link 250. For example, the communications interface 246 and the communications interface 266 may include a high-definition multimedia interface (HDMI), a universal serial bus (USB) interface, a FireWire interface, a Bluetooth interface, a ZigBee interface, and/or a Wi-Fi interface. For example, the communications interface 246 and the communications interface 266 may be used to transfer image data from the image capture device 240 to the personal computing device 260 for image signal processing (e.g., filtering, tone mapping, stitching, and/or encoding) to generate output images based on image data from the image sensors 242 and 244.

The processing apparatus 262 may include one or more processors having single or multiple processing cores. The processing apparatus 262 may include memory, such as random access memory device (RAM), flash memory, or any other suitable type of storage device such as a non-transitory computer readable memory. The memory of the processing apparatus 262 may include executable instructions and data that can be accessed by one or more processors of the processing apparatus 262. For example, the processing apparatus 262 may include one or more DRAM modules such as double data rate synchronous dynamic random-access memory (DDR SDRAM). In some implementations, the processing apparatus 262 may include a digital signal processor (DSP). In some implementations, the processing apparatus 262 may include an application specific integrated circuit (ASIC). For example, the processing apparatus 262 may include a custom image signal processor. The processing apparatus 262 may exchange data (e.g., image data) with other components of the personal computing device 260 via the bus 268.

The personal computing device 260 may include a user interface 264. For example, the user interface 264 may include a touchscreen display for presenting images and/or messages to a user and receiving commands from a user. For example, the user interface 264 may include a button or switch enabling a person to manually turn the personal computing device 260 on and off. In some implementations, commands (e.g., start recording video, stop recording video, or snap photograph) received via the user interface 264 may be passed on to the image capture device 240 via the communications link 250.

Global tone mapping can be applied as a variable gain that is applied on the linear RGB vales according to their luminance in order to have a better repartition of the information on the output range. This gain may depend on the input histogram of luminance values and a target histogram that has to be matched (e.g., a flat histogram to equalize the image or a Gaussian histogram to have a better enhancement of shadows/highlights). Consider a pixel value $x_n=[R,G,B]^T$. A global tone mapping gain $\lambda(\ )$ may be applied as follows: $\acute{x}_n=\lambda(Y(x_{ni}))*x_n$ where $\acute{x}_n$ is a global tone mapped pixel value and $Y(x)$ is a discrete approximation of the luminance defined by a linear combination of the R, G and B channels.

Global tone mapping can be a good approach to increase the entropy or to match a given histogram of pixel luminance but doesn't take into account the spatial repartition of the image data. Indeed, two images can have the exact same histogram but can represent either a smooth gradient or a noisy image. A goal of the global tone mapping is to widen the ranges of the input dynamic range that represent more information of the image at the expense of a compression in the range(s) of luminance values of that represent less information. This leads to a loss of contrast in some areas of the image. A resulting loss of contrast may not be that important if the compressed information is not gathered at the same location in the image, but when compressed information is spatially concentrated, it can lead to unnatural and/or low quality rendering of the image. In order to preserve or enhance some of the details that may be lost using global tone mapping only, spatial information may be introduced, which may enable keeping the contrast in these areas. A local tone mapping may help to reach this goal.

For example, a process for local tone mapping may include: separating the low and high frequencies of the input image in order to preserve the high frequency contrast and to compress low frequency transitions. Some inexpensive (in terms of computing resources) local tone mapping approaches are based on unsharp mask techniques, which may introduce halos. In order to have strong local tone mapping on high dynamic range images, halos may be suppressed by using an edge-aware filtering (e.g., a bilateral filter). High and low frequency components of an image may then be recombined to achieve preservation and/or amplification of the details.

Figure 3:
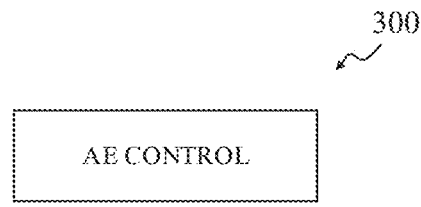
FIG. 3 is a diagram of an auto-exposure control module for auto-exposure control according to implementations to this disclosure.

FIG. 3 is a diagram of an auto-exposure control module 300 for auto-exposure control according to implementations to this disclosure. In an example, the auto-exposure control module 300 can be a module of the processing apparatus 212 of FIG. 2A. In an example, the auto-exposure control module 300 can be a module of the processing apparatus 262 of FIG. 2B.

The auto-exposure control module 300 can determine auto-exposure settings and set the auto-exposure settings of the image capture system. The auto-exposure control module 300 can determine and set auto-exposure settings in a still mode (e.g., when the image capture system 100 is configured to acquire still images), video mode (e.g., when the image capture system 100 is configured to acquire video sequences), and time-lapse mode (e.g., when the image capture system 100 is configured to acquire a time-lapse). More, less, or other modes are also possible.

In time-lapse mode, and using preview images, the auto-exposure control module 300 can continuously update the exposure time for a next frame or image to be captured. In time-lapse mode, the auto-exposure control module 300 can also adaptively apply a damping factor as further described below.

Figure 4:
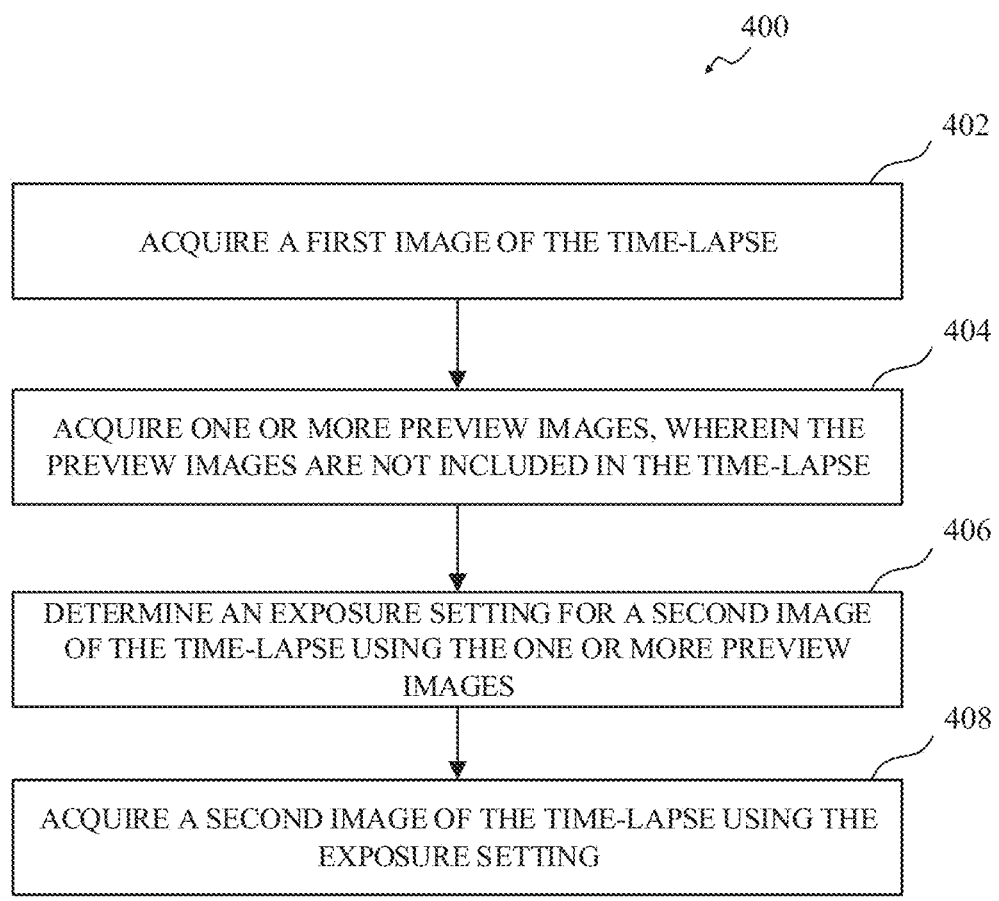
FIG. 4 is a flowchart diagram of an example of a technique for generating a time-lapse using a camera according to an implementation of this disclosure.

FIG. 4 is a flowchart diagram of an example of a technique 400 for generating a time-lapse using a camera according to an implementation of this disclosure. The technique 400 includes acquiring 402 a first frame of the time-lapse, acquiring 404 one or more preview images that are not to be included in the time-lapse, determining 406 an exposure setting for a second frame of the time-lapse using the one or more preview images, and acquiring 408, using the camera, the second frame of the time-lapse using the exposure setting.

The technique 400 may be implemented by the system 200 of FIG. 2A or the system 230 of FIG. 2B. For example, the technique 400 may be implemented by an image capture device, such the image capture device 210 shown in FIG. 2, or an image capture apparatus, such as the image capture apparatus 110 shown in FIG. 1. For example, the technique 400 may be implemented by a personal computing device, such as the personal computing device 260. The technique 400 can be implemented, at least partially, by the auto-exposure control module 300 of FIG. 3.

Figure 5:
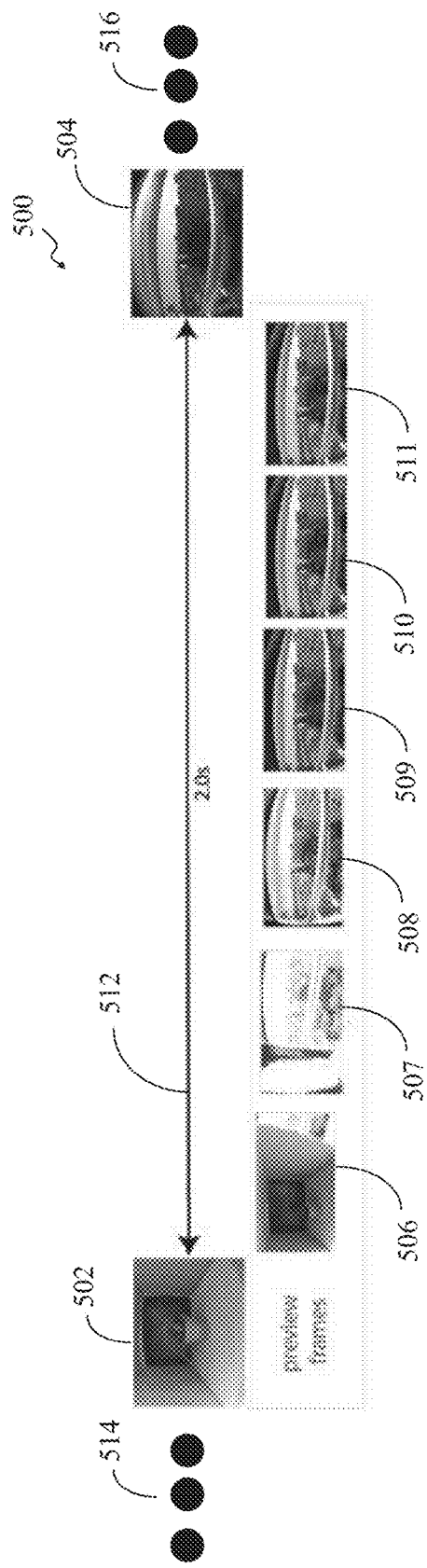
FIG. 5 is an example of a high scene change during time-lapse capture according to implementations of this disclosure.

The technique 400 is explained with reference to FIG. 5. The same explanation is applicable to FIG. 6. FIG. 5 is an example 500 of a high scene change during time-lapse capture according to implementations of this disclosure. The example 500 displays a segment of a time-lapse between two consecutive frames of the time-lapse. The example 500 includes a first frame 502 of the time-lapse, a second frame 504 of the time-lapse, one or more preview images 506-511, and a time gap 512. The time gap 512 is shown as being 2 seconds. However, the time gap can be of any length. Ellipses 514 indicate that the first frame 502 may be preceded by other frames in the time-lapse. Ellipses 516 indicate that the second frame 504 may be followed by other frames in the time-lapse. The one or more preview images 506-511 includes a last preview image 508. The last preview image 508 is the last preview that is taken immediately before the second frame 504 during the time gap 512. The one or more preview images 506-511 also includes a first preview image 506 that is taken immediately after the first frame 502 and images 514-516.

The example 500 depicts an example where a capture device captured the first frame 502 in an in-door setting where luminance is low. The capture device is then panned to capture (the second frame 504) an out-door scene where luminance may be significantly higher than the luminance of the scene of the first frame 502. The camera is panned between the preview images 506-508 and remains fixed on the out-door scene between preview images 508-511. As such, the example 500 is an example of high scene change during time-lapse capture.

Figure 6:
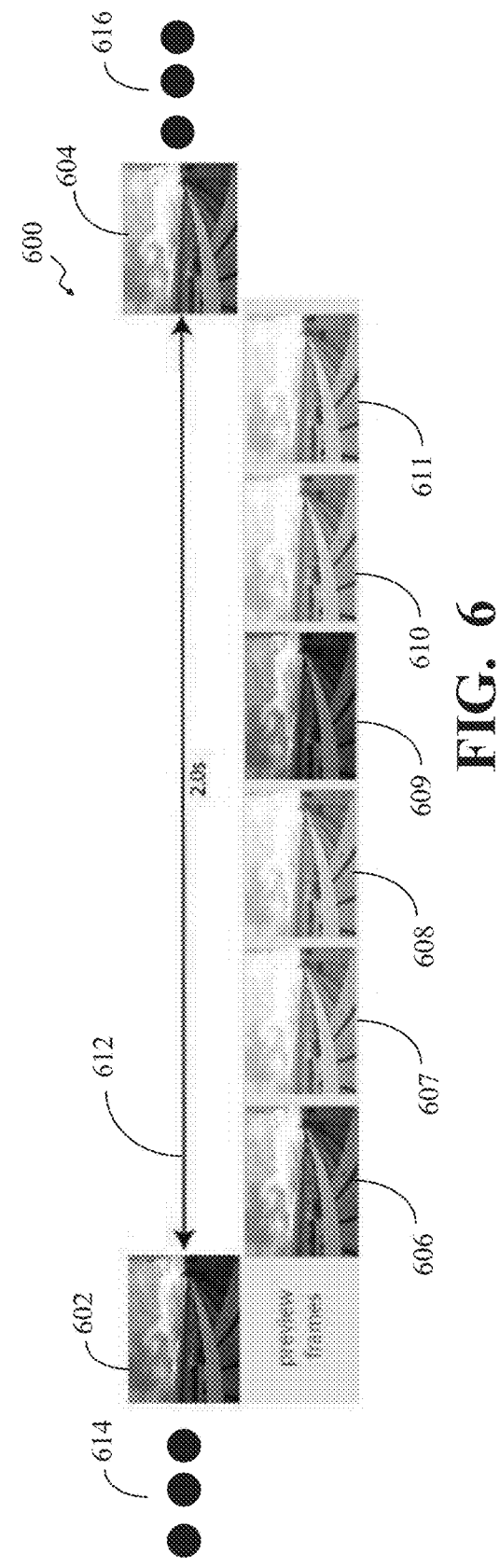
FIG. 6 is an example of a low scene change during time-lapse capture according to implementations of this disclosure.

FIG. 6 is an example 600 of a low scene change during time-lapse capture according to implementations of this disclosure. The example 600 displays a segment of a time-lapse between two consecutive frames of the time-lapse. The example 600 includes a first frame 602 of the time-lapse, a second frame 604 of the time-lapse, one or more preview images 606-611, and a time gap 612. The time gap 612 is shown as being 2 seconds. However, the time gap can be of any length. Ellipses 614 indicate that the first frame 602 may be preceded by other frames in the time-lapse. Ellipses 616 indicate that the second frame 604 may be followed by other frames in the time-lapse. The one or more preview images 606-611 includes a last preview image 608. The last preview image 608 is the last preview that is taken immediately before the second frame 604 during the time gap 612. The one or more preview images 606-611 also includes a first preview image 606 that is taken immediately after the first frame 602 and images 614-616.

The example 600 depicts an example where a capture device captured the first frame 602 of a cloudy sky where luminance is low. The scene becomes less cloudy. As such, the scene of the second frame 604 has slightly higher luminance than the scene of the first frame 602. As such, the example 600 is an example of low scene change during time-lapse capture.

Referring again to FIG. 4. The technique 400 includes acquiring 402 a first frame of the time-lapse. As used in this disclosure, "acquire" means to identify, select, construct, determine, specify, capture, identify, or other acquire in any manner whatsoever. For example, the auto-exposure control module 300 of the processing apparatus 212 can acquire the first frame 502 via the bus 224 of FIG. 2A. For example, the auto-exposure control module 300 of the processing apparatus 262 can acquire the first frame 502 via the communications link 250 of FIG. 2B.

The technique 400 includes acquiring 404 one or more preview images 506-511. The preview images are as described with respect to FIG. 5. The preview images are acquired during the time gap 512. The preview images are not included in the time-lapse. Preview images can be acquired at a preview image capture rate. The preview image capture rate can be set by an operator (e.g., a human user). The preview image capture rate can be set to a video capture rate (e.g., 30 fps). The preview image capture rate can be selected by the technique 400. In an example, the technique 400 can select the preview image capture rate based on scene complexity, available resources (e.g., available computing time), or other criteria.

The technique 400 includes determining 406 an exposure setting for a second frame of the time-lapse using the one or more preview images. For example, the technique 400 can use the one or more preview images 506-511 to determine an exposure setting for the second frame 504. In an implementation, the technique 400 determines the exposure setting based on a last exposure setting of the last preview image (i.e., the exposure setting of the last preview image 511).

The technique 400 also includes acquiring 408, using the camera, a second frame of the time-lapse using the exposure setting.

In an implementation, the technique 400 can temporally smooth the one or more preview images between the first preview image and the last preview image. For example, the technique 400 can successively temporally smooth at least some of the each of the one or more preview images 506-511. For example, the technique 400 can apply temporal smoothing every other preview image. For example, the technique 400 can apply temporal smoothing for all preview images. In other examples, other subsets of the preview images can be selected for temporal smoothing.

In an implementation, the temporal smoothing can be as described above with respect to the auto-exposure video mode. As such, the exposure setting of the second frame 504 can be based on a last exposure setting of the last preview image 511. Some of the one or more preview images 506-511 that are captured close to the scene change (e.g., preview images 506-508) may be overexposed (or underexposed). For example, the image 507 is overexposed. However, by temporally smoothing at least some of the each of the one or more preview images 506-511, the exposure converges in subsequent preview images.

In an implementation, determining 406 an exposure setting for a second frame of the time-lapse using the one or more preview images can include temporally smoothing the first frame and the last preview image. For example, temporal smoothing can be applied between the last preview image 511 and the second frame 504. In an implementation, and in the case of low scene changes, such as the case of FIG. 6, it may not be necessary to temporally smooth the preview images. That is temporal smoothing may not be applied to the preview images in the case of low scene changes.

Temporally smoothing between the first frame and the last preview image may still result in over- or under-exposure. This is so because the temporal smoothing can prevent fast or slow exposure changes. As such, a next frame (e.g., the second frame 504, 604) may still be over- or under-exposed. In an implementation, and to solve the problem, determining 406 an exposure setting for a second frame of the time-lapse using the one or more preview images can include applying a damping factor to the exposure setting. The damping factor can be based on a first exposure setting of the first frame (e.g., the first frame 502) and a second exposure setting of the last preview image (e.g., the last preview image 511).

Figure 7:
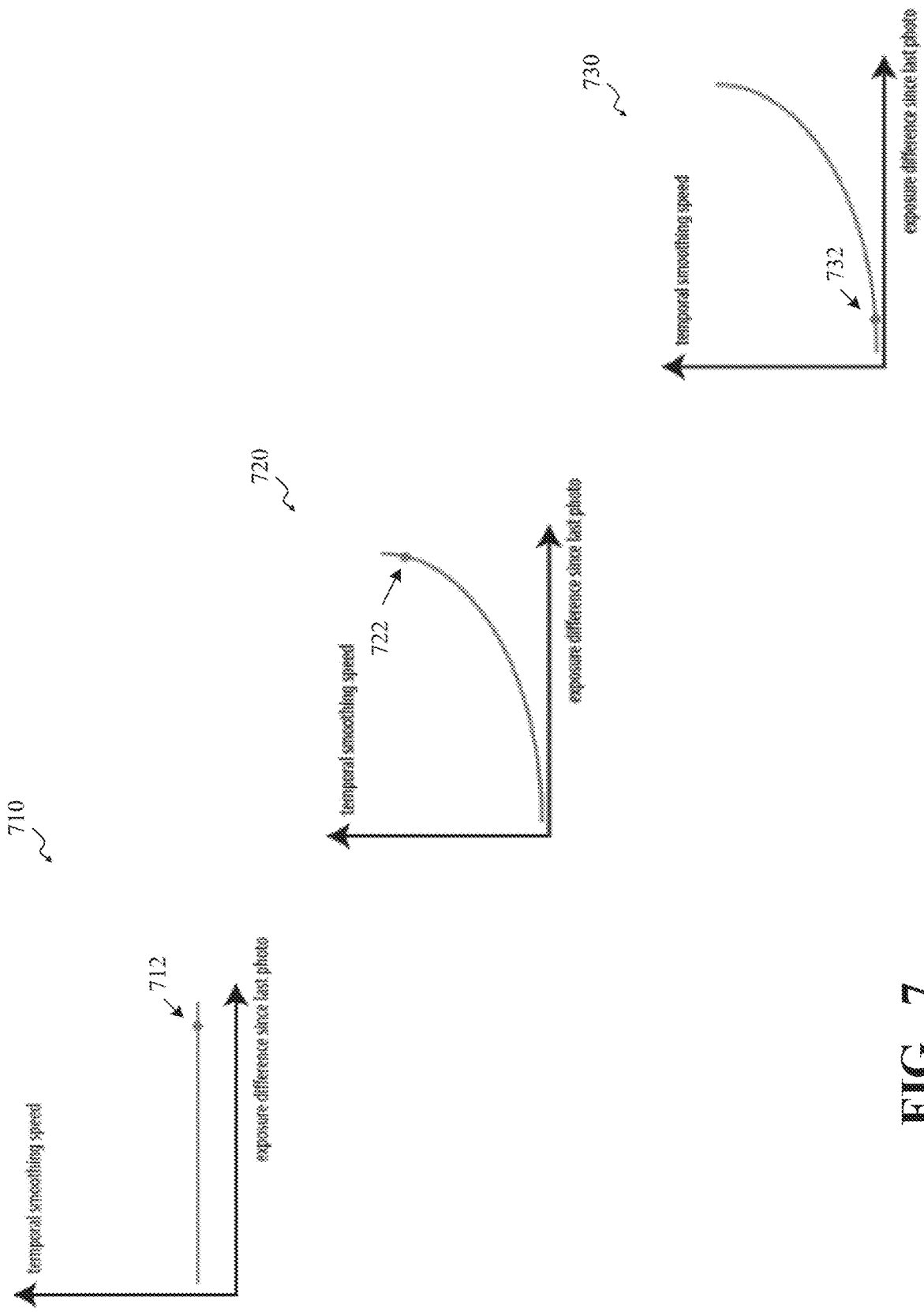
FIG. 7 is an example of temporal smoothing graphs according to implementations of this disclosure.

FIG. 7 is an example of temporal smoothing graphs according to implementations of this disclosure. The temporal smoothing graphs can be used to determine a damping factor.

As described above, temporal smoothing determines the number transition frames as described above. Alternatively, the temporal smoothing speed can determine a multiplicative factor that can be applied. For example, if the first exposure of the first frame is 100 ms, the exposure of the last preview image is 20 ms, and the damping factor is determined to be 25%, then the exposure can be set for the second frame (e.g., the second frame 504) can be set to |(100−20) |*0.25+20=40 ms.

When no damping is applied, the temporal smoothing speed can be constant. That is, regardless of the exposure difference (e.g., the difference between the first frame 502 and the last preview image 511), the same temporal smoothing speed (i.e., damping factor) can be used. Graph 710 is an example of constant temporal smoothing. In the graph 710, regardless of the exposure difference, the same temporal smoothing 712 is used.

In other implementations, the damping factor can be an adaptive temporal factor that adapts to the difference between the first exposure setting and the exposure setting of the last preview image. That is, the damping factor can be adaptive to the exposure difference. In an implementation, the damping factor can adapt to the difference of luminosity between the first frame and the last preview image.

Graphs 720 and 730 are examples of a graph that can be used to select a damping factor. The graphs 720 and 730 are shown as depicting an exponential relationship between the exposure difference and the temporal smoothing speed. However, other relationships can be available between the exposure difference and the temporal smoothing speed.

In the case of high scene change (i.e., high exposure difference), fast smoothing speed can be selected. The fast smoothing speed results in fast exposure convergence, which, in turn, results in properly exposed second frame (i.e., the frame is not over-exposed). A damping factor 722, on the graph 720, can be selected when high scene change is determined, such as in the case of FIG. 5.

In the case of low scene change (i.e., low exposure difference), slow smoothing speed can be selected. The slow smoothing speed results in strong smoothing which prevents flickering and results in a smoothed video replay of the time-lapse. A damping factor 732, on the graph 730, can be selected when low scene change is determined, such as in the case of FIG. 6.

As described above, during high scene change, the preview image can be used to estimate correct exposure for a next frame. Adaptive temporal smoothing can be used to converge quickly to the correct exposure. During low scene change, the adaptive temporal smoothing results in slow exposure convergence thereby avoiding flickering caused by random luminosity change.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of human or machine cognizable steps which perform a function. Such program may be rendered in virtually any programming language or environment including, for example, C/C++, C #, Fortran, COBOL, MATLAB™, PASCAL, Python, assembly language, markup languages, such as HTML, Standard Generalized Markup Language (SGML), XML, Voice Markup Language (VoxML), as well as object-oriented environments such as the Common Object Request Broker Architecture (CORBA), Java™ (including J2ME, Java Beans), and/or Binary Runtime Environment, such as Binary Runtime Environment for Wireless (BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory, such as NAND/NOR, memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays, such as field programmable gate arrays, PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire, such as FW400, FW110, and/or other variations, USB, such as USB2, Ethernet, such as 10/100, 10/100/1000 (Gigabit Ethernet, 10-Gig-E, and/or other Ethernet implementations), MoCA, Coaxsys, such as TVnet™, radio frequency tuner, such as in-band or out-of-band, cable modem, and/or other radio frequency tuner protocol interfaces, Wi-Fi (802.11), WiMAX (802.16), personal area network (PAN), such as 802.15, cellular, such as 3G, LTE/LTE-A/TD-LTE, GSM, and/or other cellular technology, IrDA families, and/or other network interfaces.

As used herein, the term "Wi-Fi" includes one or more of IEEE-Std. 802.11, variants of IEEE-Std. 802.11, standards related to IEEE-Std. 802.11, such as 802.11 a/b/g/n/s/v, and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(such as, IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum, such as infrared, ultraviolet, and/or other energy, such as pressure waves.

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

What is claimed is:

1. A method for reducing overexposure or underexposure in a time-lapse, comprising:
    acquiring, using an image capture device, a first frame of the time-lapse using a first exposure setting, wherein the first frame of the time-lapse is acquired under a first luminance condition; and
    acquiring, using the image capture device, a second frame of the time-lapse,
        wherein the second frame of the time-lapse is acquired under a second luminance condition that is different from the first luminance condition,
        wherein the second frame of the time-lapse is acquired using an exposure setting that is determined based on respective exposure settings of one or more preview images obtained between the first frame of the time-lapse and the second frame of the time-lapse, and
        wherein the one or more preview images are not included in the time-lapse.

2. The method of claim 1, wherein the first luminance condition is a lower luminance condition than the second luminance condition.

3. The method of claim 2, wherein the first luminance condition corresponds to an indoor luminance condition and the second luminance condition corresponds to an outdoor luminance condition.

4. The method of claim 2, wherein the first luminance condition and the second luminance condition correspond to different indoor luminance conditions.

5. The method of claim 2, wherein the first luminance condition and the second luminance condition correspond to different outdoor luminance conditions.

6. The method of claim 2, wherein the first luminance condition corresponds to a sunny luminance condition and the second luminance condition corresponds to a cloudy luminance condition.

7. The method of claim 1, wherein the first frame is an image of a first scene and the second frame is an image of a second scene that is different from the first scene.

8. An imaging device, comprising:
a processor configured to:
obtain a first frame of a time-lapse using a first exposure setting;
set a second exposure setting,
wherein the second exposure setting is based on respective exposure settings of one or more preview images obtained after the first frame of the time-lapse and before a second frame of the time-lapse, and
wherein the one or more preview images are not included in the time-lapse; and
obtain the second frame of the time-lapse using the second exposure setting.

9. The imaging device of claim 8, wherein the first frame of the time-lapse is acquired under a first luminance condition and the second frame of the time-lapse is acquired under a second luminance condition.

10. The imaging device of claim 9, wherein the first luminance condition is a lower luminance condition than the second luminance condition.

11. The imaging device of claim 10, wherein the first luminance condition corresponds to an indoor luminance condition and the second luminance condition corresponds to an outdoor luminance condition.

12. The imaging device of claim 10, wherein the first luminance condition and the second luminance condition correspond to different indoor luminance conditions.

13. The imaging device of claim 10, wherein the first luminance condition and the second luminance condition correspond to different outdoor luminance conditions.

14. The imaging device of claim 10, wherein the first luminance condition corresponds to a sunny luminance condition and the second luminance condition corresponds to a cloudy luminance condition.

15. The imaging device of claim 10, wherein the first frame is an image of a first scene and the second frame is an image of a second scene that is different from the first scene.

16. A non-transitory computer-readable storage medium, comprising executable instructions that, when executed by a processor, facilitate performance of operations to reduce overexposure or underexposure in a time-lapse, the operations comprising operations to:
obtain a first frame of the time-lapse using a first exposure setting;
obtain one or more preview images after obtaining the first frame and before obtaining a second frame of the time-lapse, wherein the one or more preview images are not included in the time-lapse;
obtain a second exposure setting based on respective exposure settings of at least some of the one or more preview images; and
obtain the second frame of the time-lapse using the second exposure setting.

17. The non-transitory computer-readable storage medium of claim 16, wherein the first frame of the time-lapse is acquired under a first luminance condition and the second frame of the time-lapse is acquired under a second luminance condition.

18. The non-transitory computer-readable storage medium of claim 17, wherein the first luminance condition corresponds to an indoor luminance condition and the second luminance condition corresponds to an outdoor luminance condition.

19. The non-transitory computer-readable storage medium of claim 17, wherein the first luminance condition corresponds to a sunny luminance condition and the second luminance condition corresponds to a cloudy luminance condition.

20. The non-transitory computer-readable storage medium of claim 17, wherein the first frame is an image of a first scene and the second frame is an image of a second scene that is different from the first scene.

* * * * *